(12) United States Patent
Choi et al.

(10) Patent No.: US 8,379,741 B2
(45) Date of Patent: Feb. 19, 2013

(54) WIRELESS COMMUNICATION SYSTEM AND METHOD FOR PERFORMING COMMUNICATION IN THE WIRELESS COMMUNICATION SYSTEM

(75) Inventors: Hyung-Jin Choi, Seoul (KR); Won-Jun Hwang, Gyeonggi-do (KR); Se-Bin Im, Gyeonggi-do (KR)

(73) Assignee: SUNGKYUNKWAN UNIVERSITY Foundation for Corporate Collaboration, Suwon-Si, Gyeonggi-Do (KR)

( * ) Notice: Subject to any disclaimer, the term of this patent is extended or adjusted under 35 U.S.C. 154(b) by 337 days.

(21) Appl. No.: 12/849,758

(22) Filed: Aug. 3, 2010

(65) Prior Publication Data

US 2011/0176583 A1 Jul. 21, 2011

(30) Foreign Application Priority Data

Aug. 5, 2009 (KR) .................. 10-2009-0072031

(51) Int. Cl.
*H04K 1/10* (2006.01)
(52) U.S. Cl. .................................................. 375/260
(58) Field of Classification Search .................... 375/260
See application file for complete search history.

(56) References Cited

U.S. PATENT DOCUMENTS

| 2007/0036071 A1* | 2/2007 | Herdin ............ 370/210 |
| 2007/0086512 A1* | 4/2007 | Can et al. ......... 375/148 |
| 2008/0063097 A1* | 3/2008 | Horiuchi et al. .... 375/260 |
| 2008/0181318 A1* | 7/2008 | Kim et al. ........ 375/260 |
| 2010/0120442 A1* | 5/2010 | Zhuang et al. ..... 455/450 |
| 2011/0097993 A1* | 4/2011 | Nakamura et al. .... 455/7 |
| 2011/0211523 A1* | 9/2011 | Seo et al. ......... 370/315 |
| 2011/0244788 A1* | 10/2011 | Ode et al. .......... 455/7 |

FOREIGN PATENT DOCUMENTS

| KR | 1020060096510 A | 9/2006 |
| KR | 1020070074256 A | 7/2007 |

OTHER PUBLICATIONS

Wang, T., et al., "Complex Field Network Coding for Multiuser Cooperative Communications", IEEE Journal on Selected Areas in Communications, vol. 26, No. 3, Apr. 2008, 11 pages.
Patent Abstract of Korean, Publication No. 10-2007-0074256, Publication Date: Jan. 9, 2006, 1 page.
Patent Abstract of Korean, Publication No. 10-2006-0096510, Publication Date: Jun. 29, 2006, 1 page.

* cited by examiner

*Primary Examiner* — Juan A Torres
(74) *Attorney, Agent, or Firm* — Osha Liang LLP (57) ABSTRACT

Provided are a wireless communication system and a method of performing communication in the same. The wireless communication system includes a terminal configured to classify all subcarriers into a first group and a second group and allocate subcarriers of the first group to first symbols and subcarriers of the second group to the first symbols again to generate and transmit a first transmission signal, a base station configured to allocate the subcarriers of the first group to second symbols and the subcarriers of the second group to third symbols to generate and transmit a second transmission signal, and a relay configured to receive the first and second transmission signals and perform maximum likelihood (ML) determination of frequency domain signals of the first and second transmission signals to estimate the first to third symbols.

13 Claims, 7 Drawing Sheets

WIRELESS COMMUNICATION SYSTEM AND METHOD FOR PERFORMING COMMUNICATION IN THE WIRELESS COMMUNICATION SYSTEM

CLAIM FOR PRIORITY

This application claims priority to Korean Patent Application No. 2009-0072031 filed on Aug. 5, 2009 in the Korean Intellectual Property Office (KIPO), the entire contents of which are hereby incorporated by reference.

BACKGROUND

1. Technical Field

Example embodiments of the present invention relate in general to a wireless communication system and method of performing communication in the same, and more specifically, to a wireless communication system for improving error performance which deteriorates when network coding is employed in a relay-based cooperative wireless communication system environment, particularly, in an asynchronous transmission environment in which an uplink transmission rate and downlink transmission rate are different from each other, and a method of performing communication in the wireless communication system.

2. Related Art

Most general wireless communication environments are asynchronous transmission environments in which the amount of data of downlink signals transmitted by a base station to a terminal is larger than the amount of data of uplink signals transmitted by the terminal to the base station.

Figure 1:
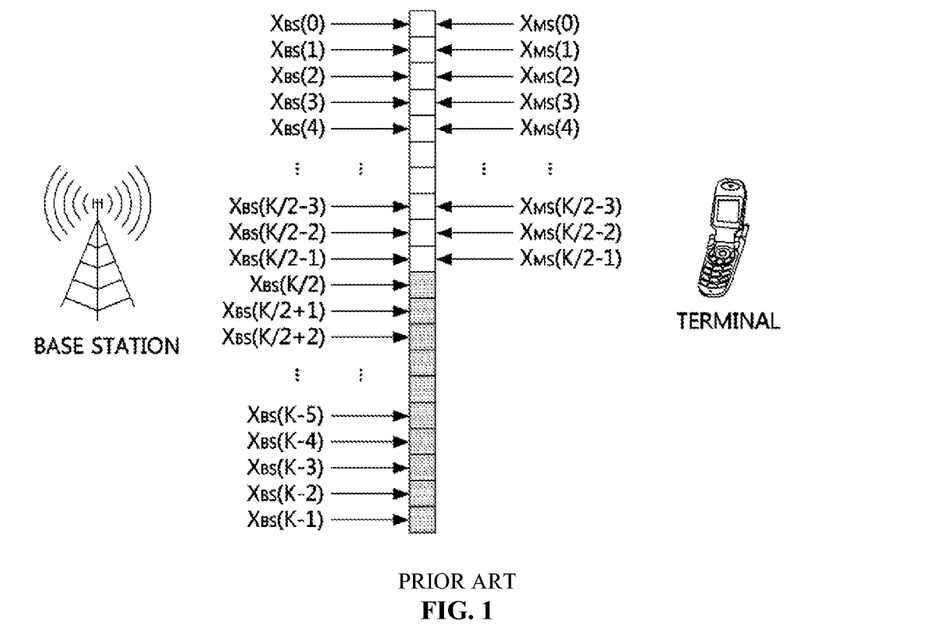
FIG. 1 is a conceptual diagram of an example of band use of a base station and a terminal in an asynchronous transmission environment.

FIG. 1 is a conceptual diagram of an example of band use of a base station and a terminal in an asynchronous transmission environment.

As shown in FIG. 1, a downlink signal is transmitted from the base station to the terminal using the entire available band, and an uplink signal is transmitted from the terminal to the base station using half the available band.

Since the uplink signal uses half the entire available band, the uplink and downlink signals overlap each other in the one half of the available band but do not overlap in the other half of the available band.

Meanwhile, in a relay-based cooperative communication system, respective transmission steps are divided according to time sections to avoid interference caused by simultaneous transmission between the uplink and downlink. In other words, transmission from a base station to a relay, transmission from the relay to a terminal, transmission from the terminal to the relay, and transmission from the relay to the base station are performed in different time sections, and four time sections are required to exchange a signal between the base station and the terminal once.

Figure 2:
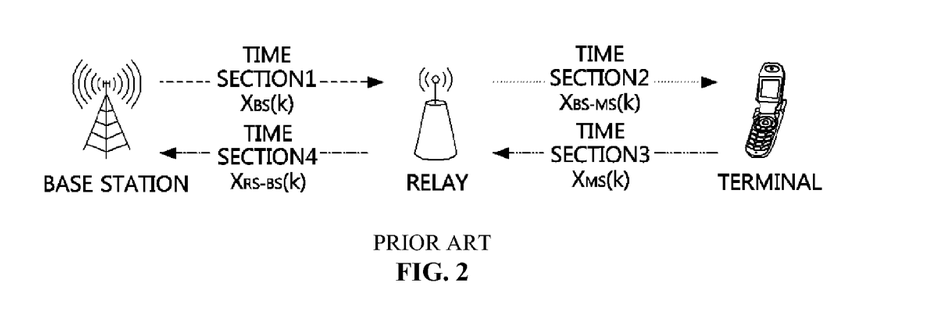
FIG. 2 is a conceptual diagram of signal exchange between a base station and a terminal via a relay by general time section division.

FIG. 2 is a conceptual diagram of signal exchange between a base station and a terminal via a relay by such general time section division. Transmission is performed from the base station to the relay in time section 1, from the relay to the terminal in time section 2, from the terminal to the relay in time section 3, and from the relay to the base station in time section 4.

However, this method has a problem in that transmission efficiency decreases as the number of time sections increases. Thus, network coding schemes in a relay have been researched to reduce the number of time sections. In other words, such time section division reduces the overall transmission rate of a system. To solve this problem, a network coding scheme in which a part of time sections are combined, and interference resulting from overlap of time sections is removed by signal processing has been suggested.

Among network coding schemes, a complex field network coding (CFNC) scheme is attracting attention as a low-complexity network coding scheme which uses addition and subtraction of complex signals while reducing the required number of time sections to half that of a general transmission method.

Figure 3:
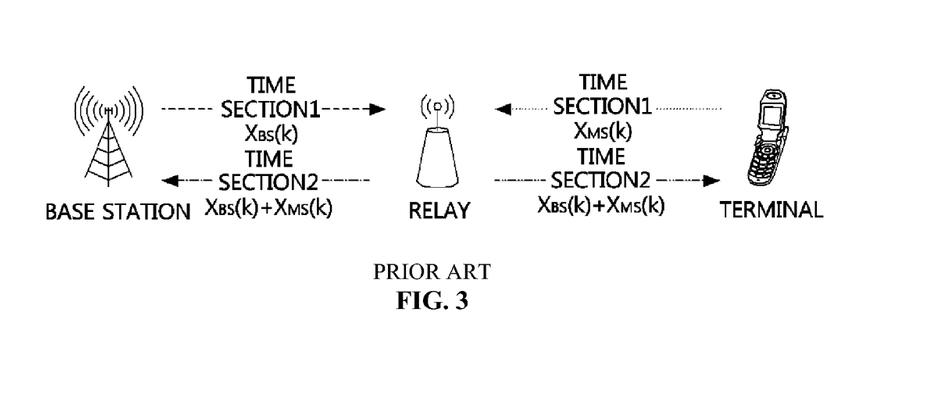
FIG. 3 is a conceptual diagram of time section division when a complex field network coding (CFNC) scheme is employed.

FIG. 3 is a conceptual diagram of time section division when the CFNC scheme is employed. In time section 1, a base station and a terminal simultaneously transmit signals to a relay, and in time section 2, relay transmission signals to which the signals transmitted by the base station and the terminal are added are transmitted to the base station and the terminal. In this way, in a relay-based cooperative wireless communication environment, respective transmission steps are divided according to time sections to avoid interference caused by simultaneous transmission between an uplink and downlink.

However, this method has a problem in that error performance significantly deteriorates during a maximum likelihood (ML) determination process performed by a relay to separate overlapping uplink and downlink signals.

SUMMARY

Accordingly, example embodiments of the present invention are provided to substantially obviate one or more problems due to limitations and disadvantages of the related art.

Example embodiments of the present invention provide a new signaling and signal processing technique for solving the above-mentioned problem in an asynchronous transmission environment.

In other words, the purpose of the example embodiments of the present invention is to provide a wireless communication system for improving error performance which deteriorates when network coding is employed in a relay-based cooperative wireless communication system environment, particularly, in an asynchronous transmission environment in which an uplink transmission rate and downlink transmission rate are different from each other, and a method of performing communication for the wireless communication system.

In some example embodiments, a wireless communication system includes: a terminal configured to classify all subcarriers into a first group and a second group, and allocate subcarriers of the first group to first symbols and subcarriers of the second group to the first symbols again to generate and transmit a first transmission signal; a base station configured to allocate the subcarriers of the first group to second symbols and the subcarriers of the second group to third symbols to generate and transmit a second transmission signal; and a relay configured to receive the first and second transmission signals, and perform maximum likelihood (ML) determination of frequency domain signals of the first and second transmission signals to estimate the first to third symbols.

In other example embodiments, a method of performing communication in a wireless communication system including a terminal, a base station and a relay includes: classifying, at a terminal, all subcarriers into a first group and a second group, and allocating subcarriers of the first group to first symbols and subcarriers of the second group to the first symbols again to generate and transmit a first transmission signal; allocating, at a base station, the subcarriers of the first group to second symbols and the subcarriers of the second group to third symbols to generate and transmit a second transmission signal; and receiving, at a relay, the first and second transmission signals, and performing ML determination of frequency domain signals of the first and second transmission signals to estimate the first to third symbols.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 4:
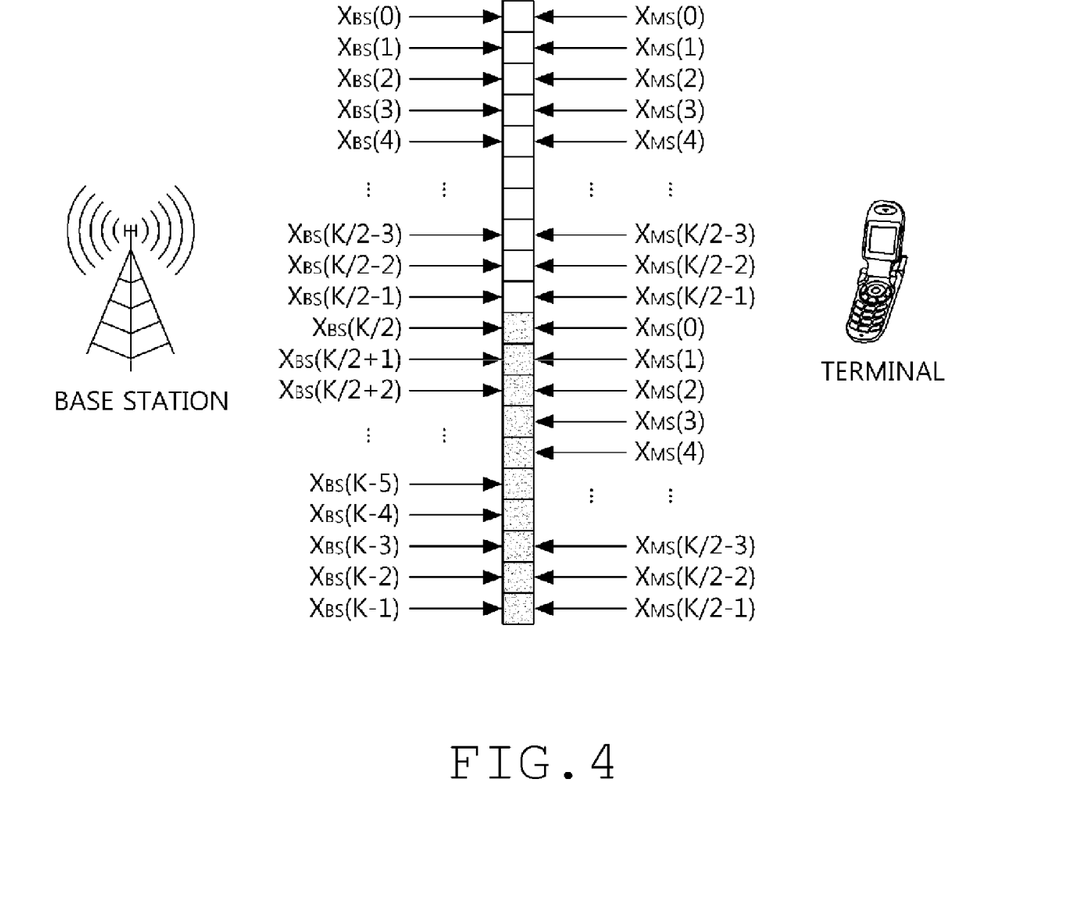
FIG. 4 is a conceptual diagram of band use of a base station and a terminal according to example embodiments of the present invention.

FIG. 4 is a conceptual diagram of band use of a base station and a terminal according to example embodiments of the present invention.

In comparison with the conventional asynchronous transmission method of FIG. 1, an uplink signal according to example embodiments of the present invention is transmitted using unused subcarriers. In this case, a terminal duplicates the signal on an unused band according to example embodiments, and the same uplink signal is repeatedly transmitted.

Figure 10:
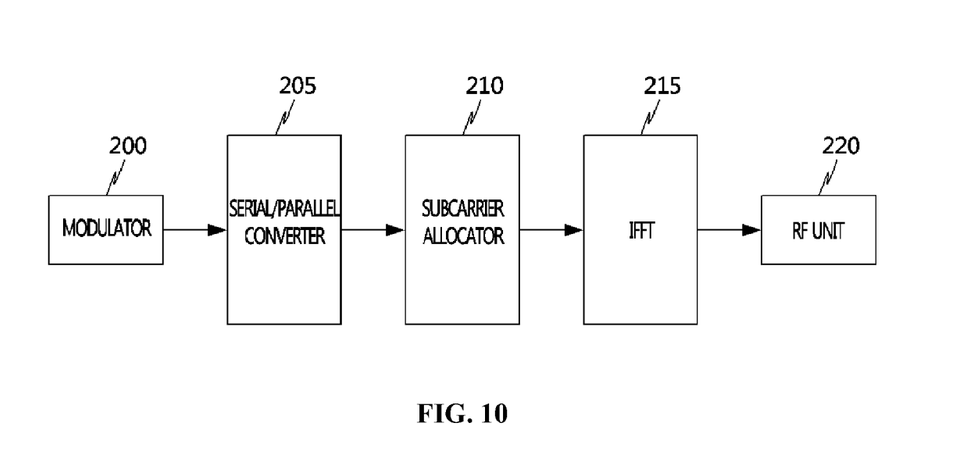
FIG. 10 is a block diagram of a transmitter of a terminal according to example embodiments of the present invention.

FIG. 10 is a block diagram of a transmitter of a terminal according to example embodiments of the present invention.

Referring to FIG. 10, the terminal transmits a signal by multiple subcarrier transmission.

The transmitter of the terminal includes a modulator 200, a serial/parallel converter 205, a subcarrier allocator 210, an inverse fast Fourier transform (IFFT) unit 215, and a radio frequency (RF) unit 220. The modulator 200 modulates symbols to be transmitted and outputs the modulated symbols to the serial/parallel converter 205. The serial/parallel converter 205 receives the serial modulation symbols and converts them into parallel modulation symbols, and then outputs the parallel modulation symbols to the subcarrier allocator 210.

The subcarrier allocator 210 allocates subcarriers to the received parallel modulation symbols. Also, the subcarrier allocator 210 allocates unused subcarriers among entire subcarriers again to the parallel modulation symbols to which the subcarriers are allocated. For example, when a ratio of used subcarriers to unused subcarriers is 1:1, the subcarrier allocator 210 allocates the unused subcarriers again to the parallel modulation symbols to which the subcarriers are allocated. In other words, one symbol is loaded on a subcarrier two times. When first to (K/2−1)th subcarriers among a total of K subcarriers are determined as a first group and K/2-th to K-th subcarriers are determined as a second group, one symbol is carried on a subcarrier of the first group and also a subcarrier of the second group.

When the ratio of used subcarriers to unused subcarriers is 1:2, the subcarrier allocator 210 may allocate a subcarrier to one symbol three times according to example embodiments of the present invention. The ratio of used subcarriers to unused subcarriers may be 1:3 or 1:4. In example embodiments of the present invention, all or a part of unused subcarriers may be used.

When an uplink signal uses half an available band, the uplink signal has a structural feature as shown in Equation 1 according to example embodiments of the present invention. Here, the subcarrier position of a repeatedly transmitted signal can be changed by interleaving, etc. However, in Equation 1, it is assumed for convenience that subcarriers of a repeatedly transmitted signal are positioned at predetermined intervals.

$$X_{MS}(K) = X_{MS}\left(k + \frac{K}{2}\right)$$
$$0 \leq k < \frac{K}{2}$$
[Equation 1]

Here, $X_{MS}(k)$ denotes a transmitted symbol.

Due to the feature as shown in Equation 1, a relay and base station can obtain diversity gain, and the error performance of an overall system is improved in example embodiments of the present invention. As an example, a base station compares the channel powers of subcarrier samples having the same symbol, selects a subcarrier sample having a greater channel power, and demodulating the symbol, thereby obtaining diversity gain.

The symbols to which subcarriers are allocated are input to the IFFT unit 215. The IFFT unit 215 performs an IFFT on the symbols and outputs the transformed symbols to the RF unit 220. The RF unit 220 includes a filter, a front end unit, etc. The RF unit 220 RF-processes the output signal of the IFFT unit 215 so that the signal can be transmitted over the air, and then transmits the RF-processed signal through a transmitter (Tx) antenna.

In this way, the terminal repeatedly loads a signal on an unused subcarrier and transmits the signal to a relay. The relay receives and transmits the transmission signal to a base station according to a complex field network coding (CFNC) scheme.

Such a transmission process between a terminal and a base station via a relay will be described with reference to FIG. 5.

Figure 5:
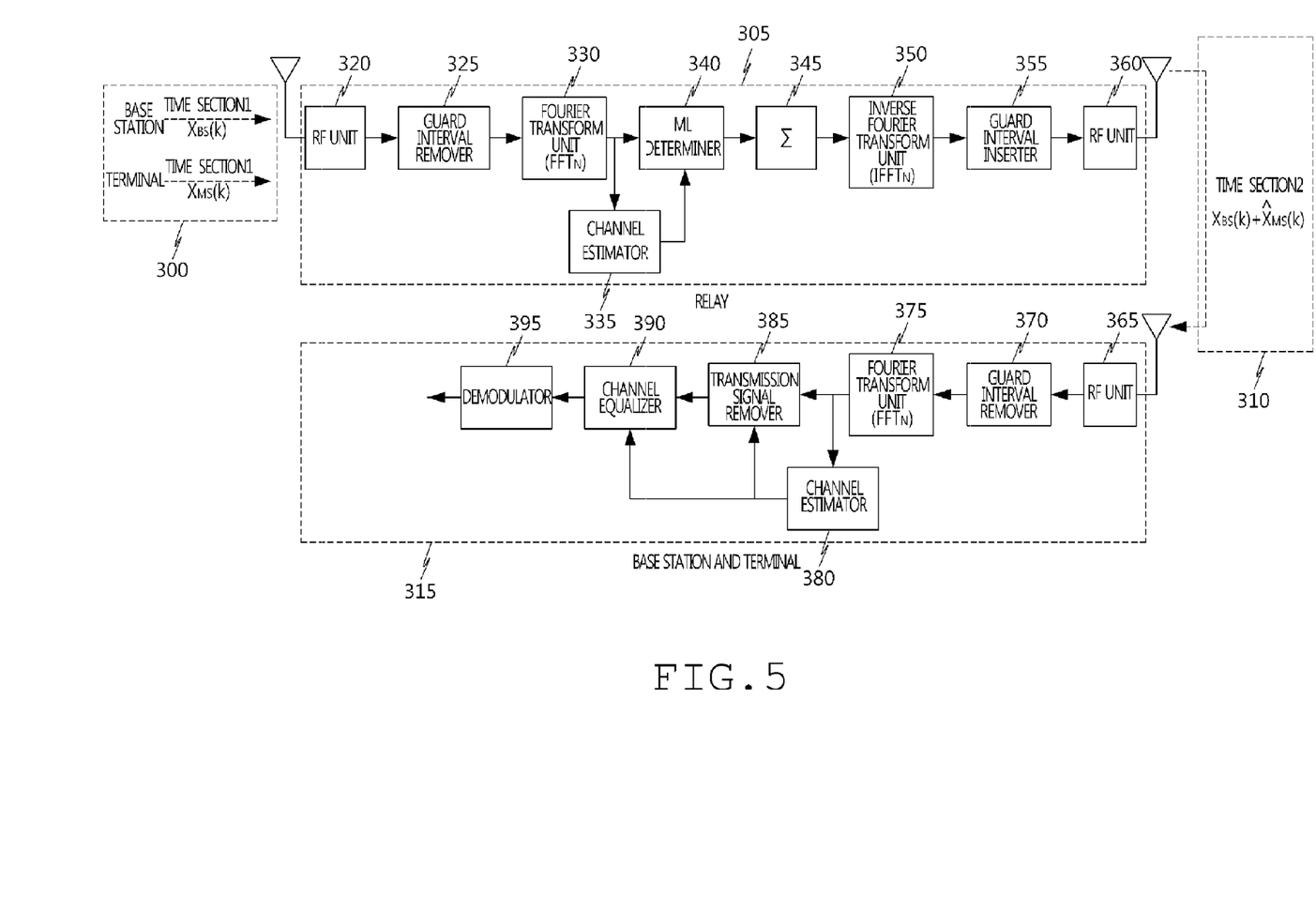
FIG. 5 is a conceptual diagram of an overall transmission process of a cooperative communication system employing the CFNC scheme.

FIG. 5 is a conceptual diagram of an overall transmission process of a cooperative communication system employing the CFNC scheme.

Referring to FIG. 5, the transmission process according to the CFNC scheme is divided into a process of transmission from a base station and a terminal to a relay (300), a process of signal processing in the relay (305), a process of transmission from the relay to the base station and the terminal (310), and a process of received signal detection in the base station and the terminal (315). During the process of transmission from the base station and the terminal to the relay (300), the base station and the terminal simultaneously transmit their orthogonal frequency division multiplexing (OFDM) transmission signals in the same time section.

During the process (305) of signal processing in the relay, the received signals are converted into baseband discrete signals from which a guard interval is removed through an RF unit 320 and a guard interval remover 325.

A Fourier transform unit 330 performs a Fourier transform, thereby converting the time domain samples into frequency domain samples. A frequency domain sample $Y_{RS}(k)$ of the received signals passing through the Fourier transform unit 330 is shown in Equation 2.

$$Y_{RS}(k) = H_{BS\text{-}RS}(k)X_{BS}(k) + H_{MS\text{-}RS}(k)X_{MS}(k) + W(k)$$
[Equation 2]

Here, $H_{BS\text{-}RS}(k)$ and $H_{MA\text{-}RS}(k)$ are frequency response values of channels corresponding to base station-relay and terminal-relay paths respectively, $X_{BS}(k)$ and $X_{MS}(k)$ are the frequency domain samples of the base station and terminal transmission signals respectively, W(k) denotes additive white Gaussian noise (AWGN), and K denotes the number of entire subcarriers in an available band.

A channel estimator 335 separately estimates channel elements of the base station-relay path and the terminal-relay path. A maximum likelihood (ML) determiner 340 separately determines overlapping uplink and downlink symbols. In this case, the ML determiner 340 uses a repeated transmission characteristic of the uplink signal, which will be described in detail with reference to FIG. 6.

Figure 6:
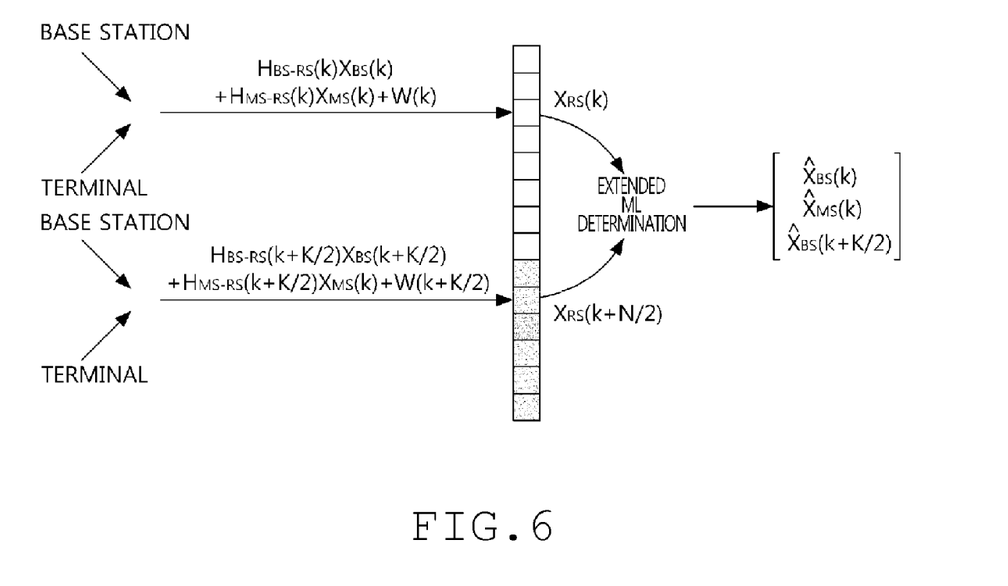
FIG. 6 is a conceptual diagram of extended maximum likelihood (ML) determination during a relay signal processing process according to example embodiments of the present invention.

FIG. 6 is a conceptual diagram of extended ML determination during a relay signal processing process according to example embodiments of the present invention.

Referring to FIG. 6, $X_{MS}(k)$ and $X_{BS}(k)$ are transmitted on first to (K/2−1)th subcarriers among a total of K subcarriers, and $X_{MS}(k)$ and $X_{BS}(k+K/2)$ are transmitted on (K/2)th to K-th subcarriers.

In other words, when the first to (K/2−1)th subcarriers among the total of K subcarriers are determined as a first group and the (K/2)th to K-th subcarriers are determined as a second group, the terminal can allocate the subcarriers of the first group and the second group to a first symbol, and the base station can allocate the subcarriers of the first group to a second symbol and the subcarriers of the second group to a third symbol. Thus, the ML determiner 340 simultaneously applies two subcarrier samples having the same terminal transmission signal to ML determination, thereby improving accuracy of symbol estimation. An extended ML determination process is expressed as Equation 3.

Since the first symbol $X_{MS}(k)$ and the second symbol $X_{BS}(k)$ are transmitted on the first to (K/2−1)th subcarriers among the total of K subcarriers, the ML determiner 340 performs ML determination of the symbols according to the first term of Equation 3. On the other hand, since the first symbol $X_{MS}(k)$ and the third symbol $X_{BS}(k+K/2)$ are transmitted on the (K/2)th to K-th subcarriers, the ML determiner 340 performs ML determination of the symbols according to the second term of Equation 3.

$$\left[\hat{X}_{BS}(k), \hat{X}_{MS}(k), \hat{X}_{BS}\left(k + \frac{K}{2}\right)\right] =$$
[Equation 3]

-continued $$\min_{[S_i,S_j,S_k]} \left[ |Y_{RS}(k) - H_{BS-RS}(k)S_i - H_{MS-RS}(k)S_j|^2 + \right.$$
$$\left. \left|Y_{RS}\left(k + \frac{K}{2}\right) - H_{BS-RS}\left(k + \frac{K}{2}\right)S_k - H_{MS-RS}\left(k + \frac{K}{2}\right)S_j\right|^2 \right]$$

Here, $0 \leq k \leq K/2$.

A hat ^ denotes an estimated value of a symbol, and Si, Sj and Sk are transmittable symbols. $Y_{RS}[k]$ denotes a signal received at the relay, $H_{BS-RS}(k)$ denotes a channel frequency response between the base station and the relay, and $H_{MS-RS}(k)$ denotes a channel frequency response between the terminal and the relay. $\hat{X}_{MS}(k)$, $\hat{X}_{BS}(k)$, and $\hat{X}_{BS}(k+K/2)$ denote estimated values of the first to third symbols respectively, and K denotes the number of entire subcarriers in an available band.

In other words, the ML determiner 340 performs ML determination of the frequency domain signals of the first and second transmission signals, thereby estimating the first to third symbols.

Equation 3 above is obtained by modifying a conventional ML determination process of estimating two symbols from one sample, and corresponds to a process of estimating three symbols from two samples.

In the next step, a complex adder 345 performs a complex addition on the separated symbols, thereby generating a transmission signal as shown in Equation 4 below.

$$X_{RS}(k) = \hat{X}_{BS}(k) + \hat{X}_{MS}(k) + \hat{X}_{BS}\left(k + \frac{K}{2}\right) \quad \text{[Equation 4]}$$
$$0 \leq k < K$$

The frequency domain transmission signal generated through the above process is high-frequency modulated through an inverse Fourier transform unit 350, a guard interval inserter 355, and an RF unit 360. During the process of transmission from the relay to the base station and the terminal (310), the relay simultaneously transmits the transmission signal generated through the process of signal processing in the relay itself to the base station and the terminal in the same time section.

During the process of received signal detection in the base station and the terminal (315), like the process of signal processing in the relay (305), the received signal is converted into frequency domain samples through an RF unit 365, a guard interval remover 370, and a Fourier transform unit 375.

A frequency domain received signal output from the Fourier transform unit 375 is as shown in Equation 5.

$$Y_{BS}(k) = H_{BS-RS}(k)X_{RS}(k) + W(k) \quad \text{[Equation 5]}$$
$$= H_{BS-RS}(k)$$
$$\left( \hat{X}_{BS}(k) + \hat{X}_{MS}(k) + \hat{X}_{BS}\left(k + \frac{K}{2}\right) \right) + W(k)$$

A channel estimator 380 performs channel estimation, and a transmission signal remover 385 removes a signal component which has been transmitted by the base station and the terminal themselves during the process of transmission from the base station and the terminal to the relay (300). After the process, there is no interference caused by overlap in the received signal. Subsequently, a channel equalizer 390 performs channel compensation, and then symbols are determined through a demodulator 395. The following bit restoration process, decoding process, etc. have no relation to example embodiments of the present invention, and thus will be omitted.

In the above-described example embodiments, a complex addition is simply performed on symbols whose MLs have been determined to transmit the result, and thus an error occurring in the relay is transmitted to the base station and the terminal. Other example embodiments of the present invention employ a double error correction scheme in which decoding and re-encoding are added to the relay signal processing process to perform first error correction, and then the base station and the terminal perform second error correction.

Figure 7:
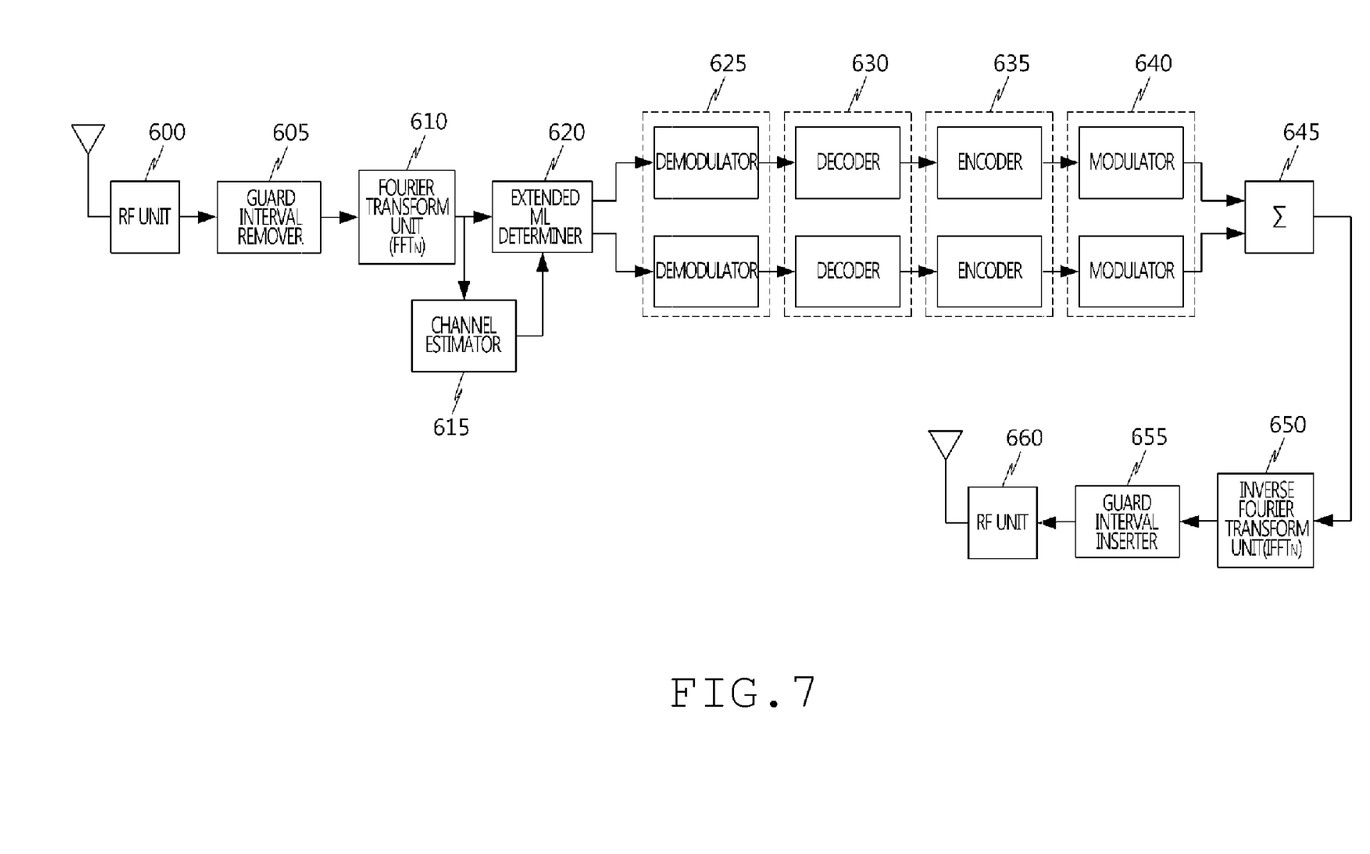
FIG. 7 is a block diagram illustrating a relay signal processing process according to example embodiments of the present invention.

FIG. 7 is a block diagram illustrating a relay signal processing process according to the other example embodiments of the present invention.

Referring to FIG. 7, a relay signal processing process according to the other example embodiments of the present invention uses the radio frequency (RF) unit 600, the guard interval remover 605, the Fourier transform unit 610, the channel estimator 615, the inverse Fourier transform unit 650, the guard interval inserter 655, and the RF unit 660. The relay signal processing process additionally includes signal processing steps in a conventional process as described below. First, transmission symbols of a base station and a terminal estimated by an extended ML determiner 620 are demodulated in bit units by demodulators 625.

Decoders 630 decode the demodulated base station transmission bits and terminal transmission bits respectively, thereby obtaining a first error correction effect.

Encoders 635 re-encode the respective error-corrected bits. Modulators 640 modulate the respective re-encoded bits into complex signals. Subsequently, a complex adder 645 performs a complex addition on the modulated complex signals, thereby generating a relay transmission signal.

Also, Galois field network coding (GFNC) in which an XOR operation is performed between bits after re-encoding in the relay may be employed as a modified form of the above process.

Consequently, the core of example embodiments of the present invention is to obtain diversity gain due to repeated transmission by modifying an uplink signaling structure, to employ an extended ML determination and symbol selection technique in which a relay and a base station make use of the diversity gain, and also to improve error performance by performing double error correction through decoding in the relay.

A simulation for verifying performance of example embodiments of the present invention was performed using an exponential decay channel model, which was a typical multipath channel environment. As the main parameters of the simulation, an FFT size N was set to 1024, a modulation scheme was set to 16 quadrature amplitude modulation (QAM), a channel coding scheme was set to (2, 1, 7) convolutional code, and the number of soft decision bits was set to 4. Also, a receiver signal-to-noise ratio (SNR) at a relay was assumed to be 20 dB, and an asynchronous transmission environment in which an uplink transmission rate was half a downlink transmission rate was assumed. On the assumption that a channel element of each path was correctly estimated, an approximate minimum mean square error (MMSE) channel compensation scheme was employed as a channel compensation technique. The approximate MMSE channel compensation scheme is expressed as Equation 6.

$$\hat{X}(k) = \frac{Y(k)(\hat{H}^*(k))}{|\hat{H}(k)|^2 + \sigma_N^2} \qquad \text{[Equation 6]}$$

Here, * denotes a complex conjugate, and $\sigma_N^2$ denotes noise power.

Figure 8:
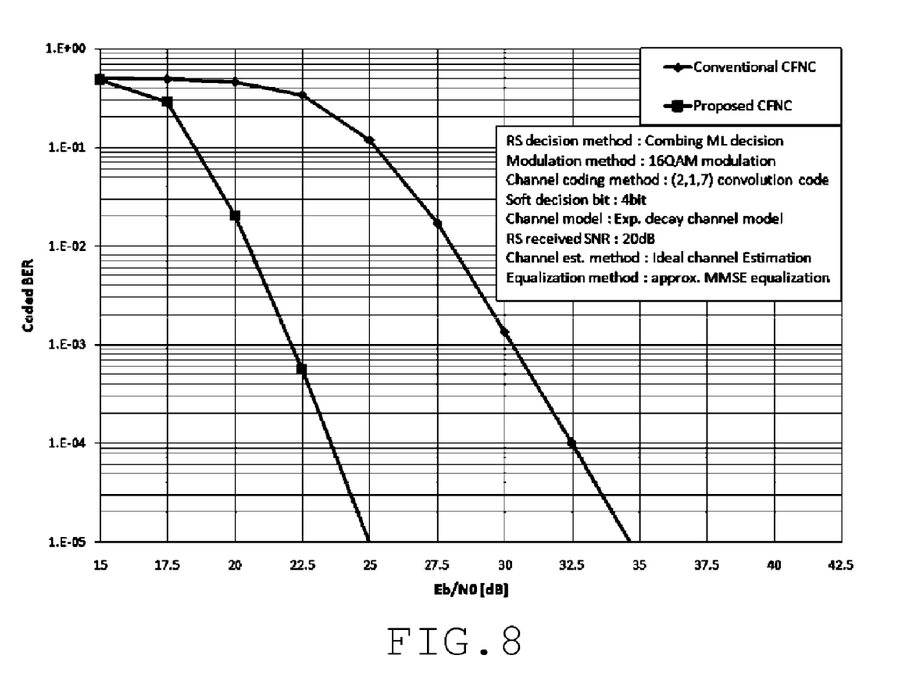
FIG. 8 is a graph showing performance of example embodiments of the present invention seen from a base station receiving end.

FIG. 8 is a graph showing performance of example embodiments of the present invention seen from a base station receiving end. In FIG. 8, Conventional CFNC denotes a conventional CFNC scheme, and Proposed CFNC denotes a scheme according to example embodiments of the present invention.

As seen from the performance graph of FIG. 8, the conventional CFNC scheme exhibits poor error performance because ML determination is employed in an environment in which interference occurs due to overlap of transmitting end and base station signals. However, in comparison with the conventional CFNC scheme, example embodiments of the present invention exhibit a remarkable performance improvement of about 10 dB in terms of Eb/No.

Figure 9:
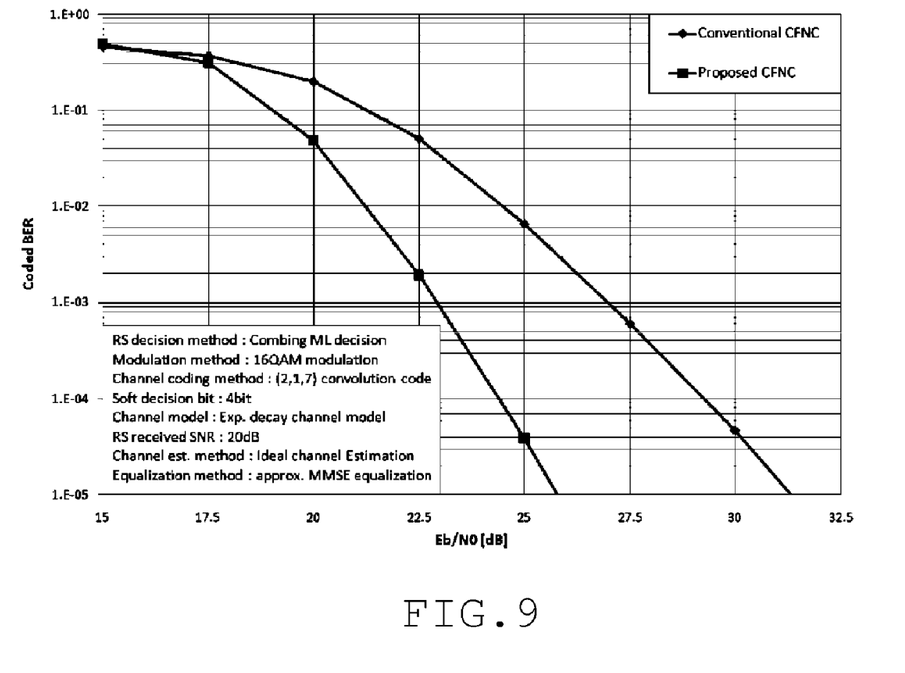
FIG. 9 is a graph showing performance of example embodiments of the present invention seen from a terminal receiving end.

FIG. 9 is a graph showing performance of example embodiments of the present invention seen from a terminal receiving end.

At a terminal receiving end, the conventional scheme exhibits better performance than at a base station receiving end because an uplink and a downlink do not overlap each other in half a band. In example embodiments of the present invention, interference occurs in the entire band due to repeated transmission. However, example embodiments of the present invention exhibit better performance than the conventional scheme in which no interference occurs in half a band because a relay processes a signal using diversity gain. Here, a base station can obtain additional diversity gain by selecting a symbol, but a terminal cannot obtain such gain. For this reason, there is still a performance improvement of about 5 dB in terms of Eb/No, which is smaller than the performance improvement at the base station.

On the same principle, example embodiments of the present invention can also be employed in a general environment in which an uplink signal does not use half an available band.

While the example embodiments of the present invention and their advantages have been described in detail, it should be understood that various changes, substitutions and alterations may be made herein without departing from the scope of the invention.

What is claimed is:

1. A wireless communication system, comprising:
a terminal configured to classify all subcarriers into a first group and a second group, and allocate subcarriers of the first group to first symbols and subcarriers of the second group to the first symbols again to generate and transmit a first transmission signal;
a base station configured to allocate the subcarriers of the first group to second symbols and the subcarriers of the second group to third symbols to generate and transmit a second transmission signal; and
a relay configured to receive the first and second transmission signals, and perform maximum likelihood (ML) determination of frequency domain signals of the first and second transmission signals to estimate the first to third symbols.

2. The wireless communication system of claim 1, wherein when a number of the subcarriers of the first group is the same as that of the subcarriers of the second group, the relay performs ML determination according to the following equation:

$$\left[\hat{X}_{BS}(k), \hat{X}_{MS}(k), \hat{X}_{BS}\left(k+\frac{K}{2}\right)\right] =$$

$$\min_{[S_i, S_j, S_k]} \left[ |Y_{RS}(k) - H_{BS-RS}(k)S_i - H_{MS-RS}(k)S_j|^2 + \right.$$

$$\left. \left|Y_{RS}\left(k+\frac{K}{2}\right) - H_{BS-RS}\left(k+\frac{K}{2}\right)S_k - H_{MS-RS}\left(k+\frac{K}{2}\right)S_j\right|^2 \right]$$

where $0 \leq k < K/2$, a hat ^ denotes an estimated value of a symbol, Si, Sj and Sk are transmittable symbols, $Y_{RS}[k]$ denotes a signal received at the relay, $H_{BS-RS}(k)$ denotes a channel frequency response between the base station and the relay, $H_{MS-RS}(k)$ denotes a channel frequency response between the terminal and the relay, $\hat{X}_{MS}(k)$ $\hat{X}_{BS}(k)$, and $\hat{X}_{BS}(k+K/2)$ denote estimated values of the first to third symbols respectively, and K denotes a number of all the subcarriers in an available band.

3. The wireless communication system of claim 2, wherein the terminal includes:
a modulator configured to modulate symbols to be transmitted;
a serial/parallel converter configured to receive and convert the serial modulation symbols into parallel modulation symbols;
a subcarrier allocator configured to receive the parallel modulation symbols from the serial/parallel converter, and allocate the subcarriers of the first group to the parallel modulation symbols and the subcarriers of the second group to the parallel modulation symbols again;
an inverse fast Fourier transform (IFFT) unit configured to perform an IFFT on the symbols received from the subcarrier allocator; and
a radio frequency (RF) unit configured to RF-process an output of the IFFT unit and transmit the RF-processed output.

4. The wireless communication system of claim 1, wherein the relay includes:
a demodulator configured to demodulate the estimated symbols in bit units after the symbols are estimated;
a decoder configured to decode the demodulated bits;
an encoder configured to re-encode the decoded bits;
a modulator configured to modulate the respective re-encoded bits into complex signals; and
a complex adder configured to perform a complex addition on the modulated complex signals to generate a relay transmission signal.

5. The wireless communication system of claim 4, wherein the relay includes the demodulators, the decoders, the encoders, and the modulators for the first transmission signal the second transmission signal respectively.

6. The wireless communication system of claim 1, wherein the base station compares channel powers of subcarriers having the same symbol, selects a subcarrier sample having a greater channel power, and demodulates the symbol.

7. The wireless communication system of claim 1, wherein a complex field network coding (CFNC) scheme is employed.

8. A method of performing communication in a wireless communication system including a terminal, a base station and a relay, the method comprising:
classifying, at a terminal, all subcarriers into a first group and a second group, and allocating subcarriers of the first group to first symbols and subcarriers of the second group to the first symbols again to generate and transmit a first transmission signal;
allocating, at a base station, the subcarriers of the first group to second symbols and the subcarriers of the second group to third symbols to generate and transmit a second transmission signal; and
receiving, at a relay, the first and second transmission signals, and performing maximum likelihood (ML) determination of frequency domain signals of the first and second transmission signals to estimate the first to third symbols.

9. The method of claim 8, wherein when a number of the subcarriers of the first group is the same as that of the subcarriers of the second group, the relay performs ML determination according to the following equation:

$$\left[\hat{X}_{BS}(k), \hat{X}_{MS}(k), \hat{X}_{BS}\left(k+\frac{K}{2}\right)\right] = $$
$$\min_{[S_i, S_j, S_k]} \left[|Y_{RS}(k) - H_{BS-RS}(k)S_i - H_{MS-RS}(k)S_j|^2 + \right.$$
$$\left. \left|Y_{RS}\left(k+\frac{K}{2}\right) - H_{BS-RS}\left(k+\frac{K}{2}\right)S_k - H_{MS-RS}\left(k+\frac{K}{2}\right)S_j\right|^2\right]$$

where $0 \leq k < K/2$, a hat ^ denotes an estimated value of a symbol, Si, Sj and Sk are transmittable symbols, $Y_{RS}[k]$ denotes a signal received at the relay, $H_{BS-RS}(k)$ denotes a channel frequency response between the base station and the relay, $H_{MS-RS}(k)$ denotes a channel frequency response between the terminal and the relay, $\hat{X}_{MS}(k)$, $\hat{X}_{BS}(k)$, and $\hat{X}_{BS}(k+K/2)$ denote estimated values of the first to third symbols respectively, and K denotes a number of all the subcarriers in an available band.

10. The method of claim 8, wherein, at a terminal, further comprising:
modulating symbols to be transmitted;
converting the modulated symbols into parallel modulation symbols;
allocating the subcarriers of the first group to the parallel modulation symbols and the subcarriers of the second group to the parallel modulation symbols again;
performing an inverse fast Fourier transform (IFFT) on the symbols to which the subcarriers are allocated; and
radio frequency (RF)-processing the transformed signal and transmitting the RF-processed signal.

11. The method of claim 8, at a relay, further comprising:
demodulating the estimated symbols in bit units after the symbols are estimated;
decoding the demodulated bits;
re-encoding the decoded bits;
modulating the respective re-encoded bits into complex signals; and
performing, at the relay, a complex addition on the modulated complex signals to generate a relay transmission signal.

12. The method of claim 11, wherein demodulating, decoding, re-encoding, and modulating are performed on each of the first transmission signal and the second transmission signal.

13. The method of claim 8, further comprising comparing, at the base station, channel powers of subcarriers having the same symbol, selecting a subcarrier sample having a greater channel power, and demodulating the symbol.

* * * * *